(12) United States Patent
Kojima et al.

(10) Patent No.: US 11,700,358 B2
(45) Date of Patent: Jul. 11, 2023

(54) DRIVE RECORDER, IMAGE RECORDING METHOD, AND RECORDING MEDIUM FOR IMAGE RECORDING

(71) Applicant: JVCKENWOOD Corporation, Yokohama (JP)

(72) Inventors: Tomoki Kojima, Yokohama (JP); Akinori Sugata, Yokohama (JP); Yukihiko Murakami, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 17/701,747

(22) Filed: Mar. 23, 2022

(65) Prior Publication Data
US 2022/0217309 A1   Jul. 7, 2022

Related U.S. Application Data

(63) Continuation of application No. PCT/JP2020/034349, filed on Sep. 10, 2020.

(30) Foreign Application Priority Data

Sep. 26, 2019 (JP) ................. 2019-174977

(51) Int. Cl.
*H04N 7/18* (2006.01)
*H04N 5/76* (2006.01)
(Continued)

(52) U.S. Cl.
CPC ............. *H04N 7/188* (2013.01); *H04N 5/76* (2013.01); *H04N 7/183* (2013.01); *H04N 23/62* (2023.01)

(58) Field of Classification Search
None
See application file for complete search history.

(56) References Cited

U.S. PATENT DOCUMENTS

| 2018/0167796 A1* | 6/2018 | Raje ..................... H04W 4/023 |
| 2020/0250911 A1* | 8/2020 | Raduchel ................ G07C 9/29 |

(Continued)

FOREIGN PATENT DOCUMENTS

| JP | H08-153298 A | 6/1996 |
| JP | 2010-169538 A | 8/2010 |

(Continued)

OTHER PUBLICATIONS

International Search Report for the corresponding PCT Application No. PCT/JP2020/034349 dated Nov. 2, 2020, 4 pages.

(Continued)

*Primary Examiner* — Hung Q Dang
(74) *Attorney, Agent, or Firm* — Shih IP Law Group, PLLC

(57) ABSTRACT

A drive recorder includes: an imaging unit, an image processing unit, a position information acquisition unit, a communication unit, and a function control processing unit. The imaging unit captures an image of a neighborhood of a vehicle. The image processing unit records the image captured by the imaging unit in a recording medium. The position information acquisition unit acquires position information on the vehicle. The communication unit communicates with a server apparatus to deliver information including the position information. The function control processing unit acquires area information transmitted from the server apparatus based on the position information, the area information relating to an area in which the vehicle is located.

5 Claims, 6 Drawing Sheets

(51) Int. Cl.
- *H04N 23/62* (2023.01)
- *G08G 1/01* (2006.01)
- *G07C 5/00* (2006.01)
- *G07C 5/08* (2006.01)
- *G08G 1/00* (2006.01)
- *H04N 5/77* (2006.01)

(56) References Cited

U.S. PATENT DOCUMENTS

2020/0267505 A1* 8/2020 Mehran ................. H04W 36/00
2021/0297841 A1* 9/2021 Jung ....................... H04W 4/90

FOREIGN PATENT DOCUMENTS

| | | |
|---|---|---|
| JP | 2015-170906 A | 9/2015 |
| JP | 2019-021208 A | 2/2019 |

OTHER PUBLICATIONS

International Preliminary Examination Report on Patentability (I) for the corresponding PCT Application No. PCT/JP2020/034349 dated Mar. 15, 2022, 10 pages.

\* cited by examiner

DRIVE RECORDER, IMAGE RECORDING METHOD, AND RECORDING MEDIUM FOR IMAGE RECORDING

CROSS-REFERENCE TO RELATED APPLICATION

This application is a continuation of application No. PCT/JP2020/034349, filed on Sep. 10, 2020, and claims the benefit of priority from the prior Japanese Patent Application No.2019-174977, filed on Sep. 26, 2019, the entire content of which is incorporated herein by reference.

BACKGROUND OF THE INVENTION

1. Field of the Disclosure

The present invention relates to a drive recorder mounted on a vehicle, an image recording method, and a recording medium for image recording.

A driver recorder mounted on a vehicle captures an image of the neighborhood of the vehicle (e.g., the scenery in front of the vehicle) and records the image. Possible uses of a driver recorder include analyzing a situation at a site of an accident, or the like, by referring to images captured by a vehicle encountering the accident or a vehicle that happens to be at the site.

Patent literature 1 discloses a related-art car navigation system. The car navigation system supports vehicle travel based on various information from a center apparatus. The center apparatus is provided with various travel environment information (map information, traffic sign and mark information, congestion information, highway regulation information, weather information, etc.) on all roads within a jurisdiction. The center apparatus supports vehicle travel by finding whether the vehicle condition information (vehicle travel condition information, vehicle information, driver information) transmitted from a vehicle-mounted apparatus at specified time intervals or every time the vehicle has traveled a certain distance is compatible (e.g., finding whether traffic regulations are not violated), in terms of safe travel, with the travel environment information maintained in the center apparatus and corresponding to the vehicle condition information, or by finding whether energy-saving travel is possible, and by, if energy-saving travel is possible, finding a travel condition, etc. through comparison, computation, and determination and transmitting the result found to the vehicle-mounted apparatus as safe travel support information or energy-saving travel support information.

Patent Literature 1: Japanese Unexamined Patent Application Publication No. 2010-169538

SUMMARY OF THE INVENTION

The car navigation system disclosed in patent literature 1 is solely used to support vehicle travel based on the various travel environment information that the center apparatus maintains. Meanwhile, the inventor of the present application has found that area information kept by the server apparatus, etc. could be used for operation of a drive recorder. The inventor of the present application has considered that the function of a driver recorder can be further improved by utilizing area information for function control such as initiation of a driver recorder recording.

The present invention addresses the above-described issue and a purpose thereof is to provide a drive recorder, an image recording method, and a recording medium for image recording capable of controlling the function relating to image recording in a vehicle based on area information.

A drive recorder according to an embodiment includes: an imaging unit that captures an image of a neighborhood of a vehicle; an image processing unit that records the image captured by the imaging unit in a recording medium; a position information acquisition unit that acquires position information on the vehicle; a communication unit that communicates with a server apparatus to deliver information including the position information; and a function control processing unit that acquires area information transmitted from the server apparatus based on the position information, the area information relating to an area in which the vehicle is located, and controls a function accordingly.

Another embodiment relates to an image recording method. An image recording method includes: capturing an image of a neighborhood of a vehicle; recording the image captured by the imaging in a recording medium; acquiring position information on the vehicle; communicating with a server apparatus to deliver information including the position information; and acquiring area information transmitted from the server apparatus based on the position information, the area information relating to an area in which the vehicle is located, and controlling a function accordingly.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

Figure 1:
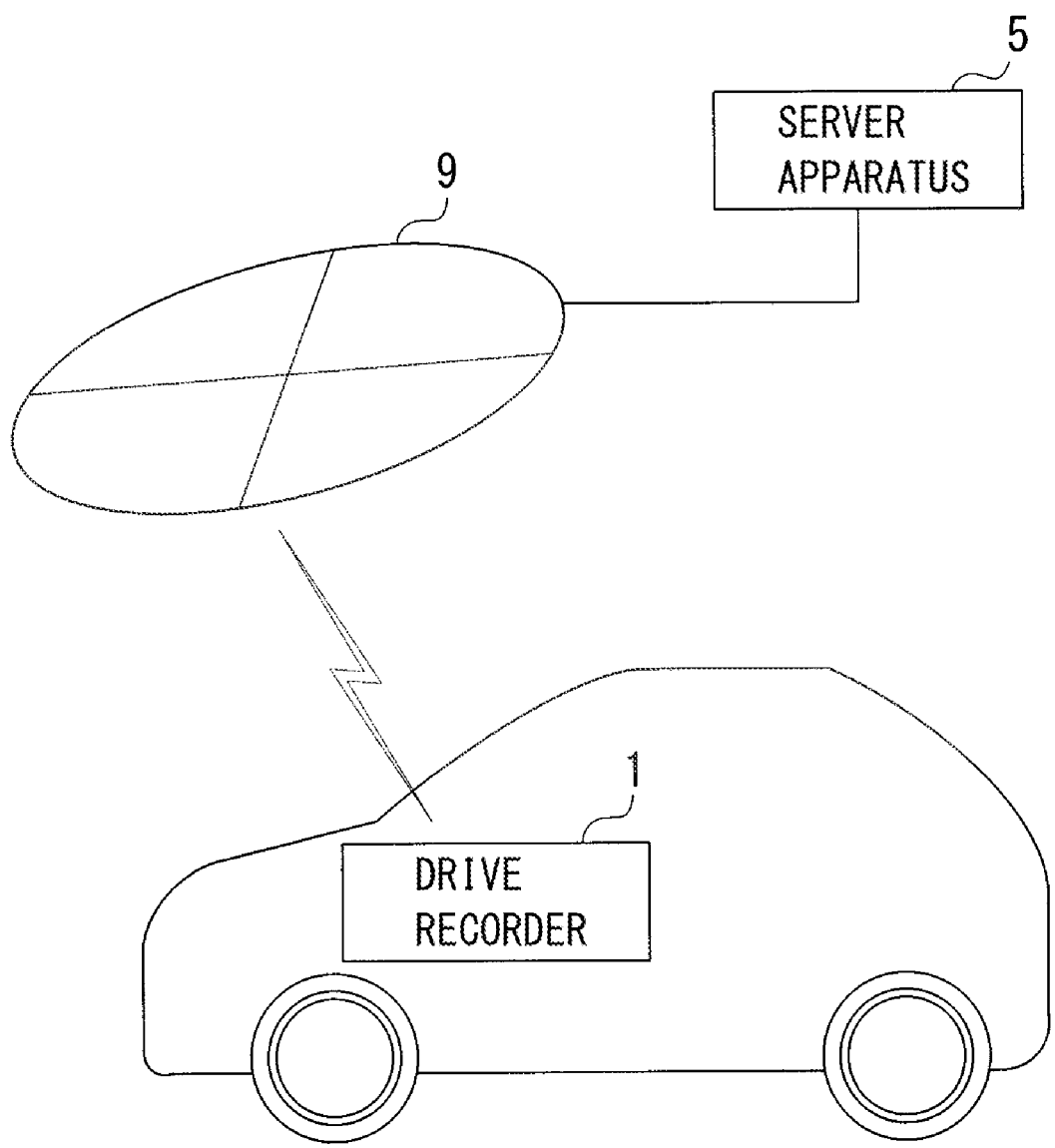
FIG. 1 is a schematic diagram showing communicable connection in a drive recorder operation system that includes a drive recorder according to embodiment 1.

The invention will now be described by reference to the preferred embodiments. This does not intend to limit the scope of the present invention, but to exemplify the invention. Hereinafter, the invention will be described based on preferred embodiments with reference to FIGS. 1 through 6. Identical or like constituting elements and members shown in the drawings are represented by identical symbols and a duplicate description will be omitted as appropriate. The dimension of members in the drawings shall be enlarged or reduced as appropriate to facilitate understanding. Those of the members that are not important in describing the embodiment are omitted from the drawings.

First Embodiment

FIG. 1 is a schematic diagram showing communicable connection in a drive recorder operation system 100 that includes a drive recorder 1 according to embodiment 1. The drive recorder operation system 100 includes the drive recorder 1 and the server apparatus 5. The drive recorder operation system 100 transmits position information on a vehicle on which the drive recorder 1 is mounted to the server apparatus 5, receives area information kept by the server apparatus 5, and controls the function of the drive recorder 1. Function control in the drive recorder 1 includes, for example, suspension or initiation of image recording.

The drive recorder 1 is mounted on a vehicle and captures an image of the neighborhood of the vehicle (e.g., the scenery in front of the vehicle) and records the image. The drive recorder 1 saves the captured image in a recording medium. Due to the limitation on the capacity of the recording medium, however, a plurality of items of image data are saved over a certain period of time, and then old image data is sequentially overwritten in the chronological order to record a new image.

The drive recorder 1 communicates with the server apparatus 5 via a communication network 9. The drive recorder 1 according to the present invention receives, from the server apparatus 5, area information relating to the area in which the vehicle is located and controls the function in the drive recorder 1 accordingly. The server apparatus 5 finds an area in which the vehicle is located based on the position information on the vehicle and transmits the area information in that area to the drive recorder 1.

In the case a restriction is imposed on recording of images due to legal regulations in the area such as a country and a region in which the vehicle is located, for example, the driver recorder 1 can automatically suspend image recording in such an area. Further, image recording may be suspended by user selection. In this case, the drive recorder may be equipped with a function of alerting the user that the vehicle is located in an area in which image recording is restricted.

Further, the drive recorder 1 may control its function to initiate image recording when the drive recorder 1 receives, as area information, traffic-related information such as information on a high accident area from the server apparatus 5. The drive recorder 1 may control its function to initiate image recording or control its function to change the image quality in image recording when the drive recorder 1 receives, as area information, information relating to sightseeing such as information on a sightseeing spot from the server apparatus 5 so that a record of travel is saved more vividly.

Figure 2:
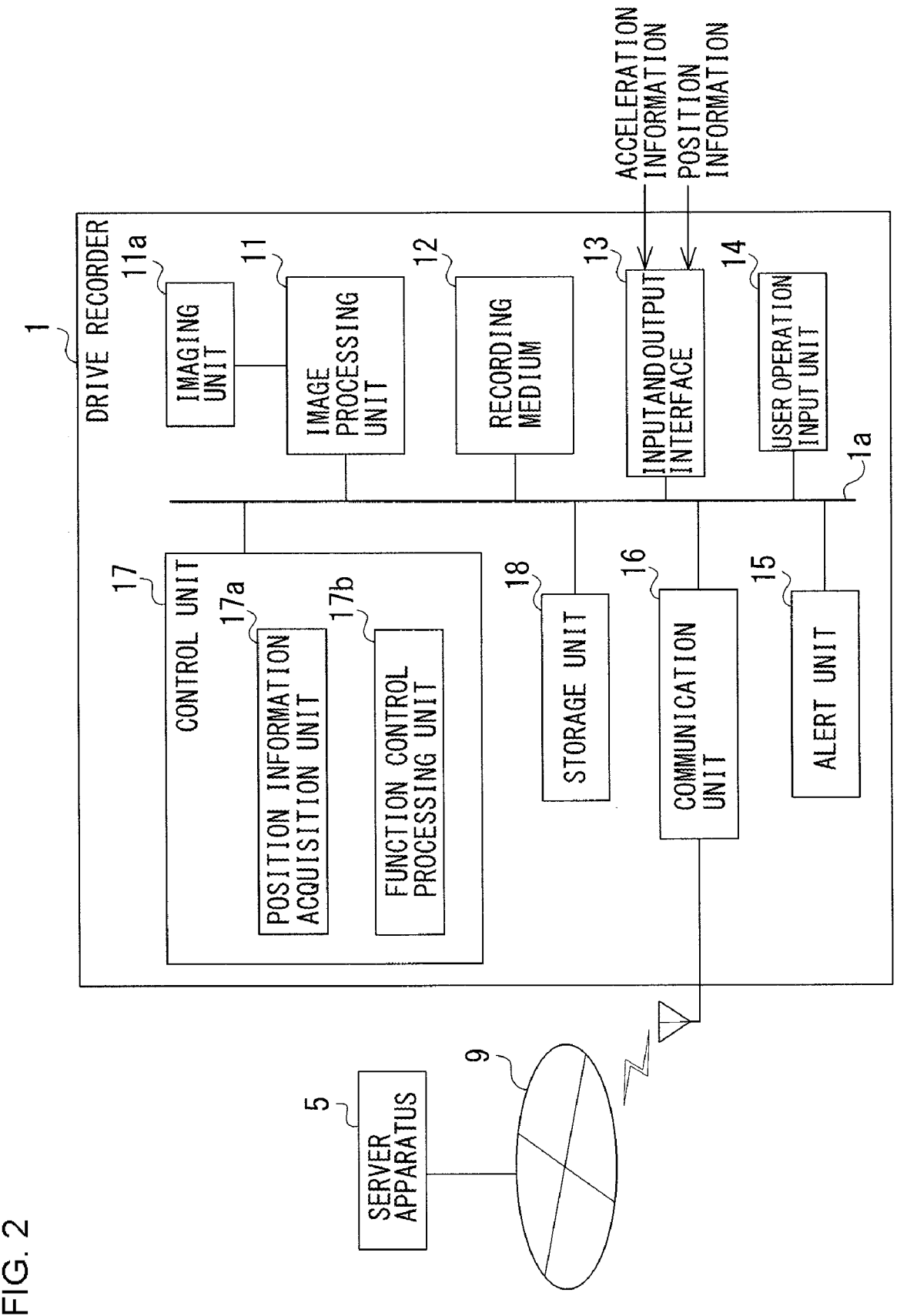
FIG. 2 is a block diagram showing a configuration of the drive recorder according to embodiment 1.
Figure 3:
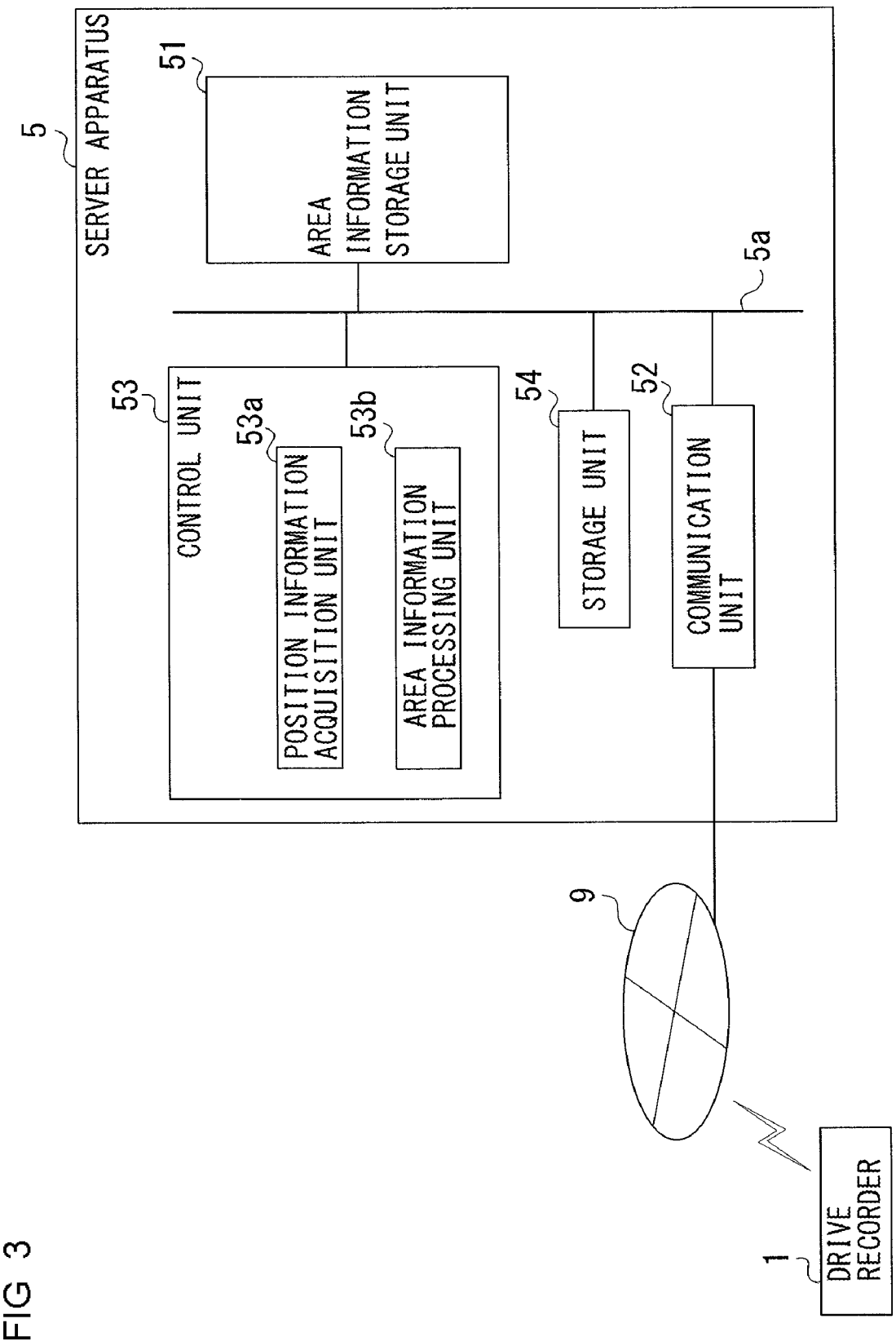
FIG. 3 is a block diagram showing a configuration of the server apparatus according to embodiment 1.

FIG. 2 is a block diagram showing a configuration of the drive recorder 1 according to embodiment 1, and FIG. 3 is a block diagram showing a configuration of the server apparatus 5 according to embodiment 1. The drive recorder 1 includes an image processing unit 11, a recording medium 12, an input and output interface 13, a user operation input unit 14, an alert unit 15, a communication unit 16, a control unit 17, etc. The image processing unit 11, the recording medium 12, the input and output interface 13, the user operation input unit 14, the alert unit 15, the communication unit 16, the control unit 17, etc. are connected by a data bus 1a to exchange electrical signals mutually.

The parts in the drive recorder 1 can be implemented in hardware such as electronic devices or mechanical components exemplified by a CPU of a computer, and in software such as a computer program. FIG. 2 depicts functional blocks implemented by the cooperation of these elements. Therefore, it will be understood by those skilled in the art that the functional blocks may be implemented in a variety of manners by a combination of hardware and software.

The image processing unit 11 processes (e.g., compresses data) an image signal captured by an imaging unit 11a and covering a certain period of time and adds index information, etc. to the image signal to generate image data. The image processing unit 11 saves the generated image data in the recording medium 12. The index information includes the location, date, and time and also includes the condition (e.g., acceleration) of the vehicle. For example, the imaging unit 11a includes an image sensor such as a CCD and a CMOS and captures an image of the neighborhood of the vehicle (e.g., the scenery in front of or behind the vehicle). The imaging unit 11a acquires the image and sends the image signal to the image processing unit 11.

For example, the recording medium 12 is an SD card, a USB memory etc. and is configured to save or delete the image data generated by the image processing unit 11. By configuring the recording medium 12 to be removably attached to the drive recorder 1, the recording medium 12 can be removed from the drive recorder 1 to allow the image to be played back on a PC etc. In this case, the drive recorder 1 is provided with a slot for inserting the recording medium, an interface configured for connection to the recording medium, etc. The recording medium 12 may be a memory or a hard disk drive permanently provided in the drive recorder 1.

The input and output interface 13 acquires acceleration information, angular speed information, vehicle moving speed, vehicle position information, etc. from an external apparatus. The drive recorder 1 may have a built-in acceleration sensor and gyro sensor for measuring acceleration and angular speed. The input and output interface 13 may acquire an output of a vehicle speed pulse sensor or acquire vehicle moving speed by communicating with the vehicle via a vehicle-mounted network such as a controller area network (CAN). The input and output interface 13 acquires latitude and longitude information as position information. The input and output interface 13 may acquire, as position information, a name of place, an address etc. acquired by finding a match on a map. The position information can be acquired by a global navigation satellite system (GNSS) receiver. The drive recorder 1 may acquire position information by a GNSS receiver provided outside or acquire position information by a built-in GNSS function. Alternatively, the position of the driver's vehicle may be estimated based on sensor information such as acceleration, angular speed, and vehicle moving speed.

The user operation input unit 14 receives input information from the user by receiving, for example, an audio user operation input collected by a microphone, a user operation input to an input apparatus such as a touch panel. The alert unit 15 alerts the user of information by an audio output from a speaker, a display output on a display apparatus such as a liquid crystal panel, etc.

The communication unit 16 communicates wirelessly with the communication network 9 in compliance with a communication standard such as WiFi (registered trademark) and communicates with the server apparatus 5 via the communication network 9. The communication unit 16 may communicate with the server apparatus 5 using communication schemes complying with the respective communication standards of the ITS communication system, the road-to-vehicle communication system, the vehicle-to-vehicle communication system, or the like. The communication unit 16 transmits and receives radio signal waves by an antenna connected thereto to communicate wirelessly with the communication network 9. Alternatively, the communication unit 16 may communicate by using a mobile communication line.

The control unit 17 includes a position information acquisition unit 17a and a function control processing unit 17b. For example, the control unit 17 is comprised of a CPU or the like and performs the processes in the respective units described above by operating in accordance with a computer program stored in a storage unit 18. The storage unit 18 is comprised of a data storage device such as a random access memory (RAM), a flash memory, and a hard disk storage device and stores the computer program, etc. executed in the control unit 17.

The position information acquisition unit 17a of the control unit 17 acquires position information on the vehicle via the input and output interface 13 or by using a built-in GNSS receiver. The position information on the vehicle acquired by the position information acquisition unit 17a is transmitted by the function control processing unit 17b to the server apparatus 5 via the communication unit 16.

The function control processing unit 17b transmits the position information on the vehicle to the server apparatus 5 via the communication unit 16 and acquires area information relating to a predetermined area from the server apparatus 5 via the communication unit 16. The function control processing unit 17b controls the function in the drive recorder 1 based on the acquired area information.

When the area information includes information indicating a restriction that necessitates suspending recording of images, the function control processing unit 17b performs function control for suspending recording of images in the image processing unit 11. Further, the function control processing unit 17b alerts the user that the vehicle is in an area with a restriction that requires suspending image recording.

A description will be given of the server apparatus 5 based on FIG. 3. The server apparatus 5 includes an area information storage unit 51, a communication unit 52, a control unit 53, etc. The area information storage unit 51, the communication unit 52, the control unit 53, etc. are connected by a data bus 5a to exchange electrical signals mutually.

The area information storage unit 51 divides a country, a region, etc. into individual areas and stores area information in the divided areas. The area information storage unit 51 stores, for example, the position of a border of each area and area information relating to restriction on image recording in that area, associating the position and the area information with each other. Given, for example, an area of a country A, the area information storage unit 51 exhaustively stores the spots representing the national border of the country A or the latitude and longitude information on the border representing the national border of the country A. The area information storage unit 51 defines an area within the border as the area of the country A and stores the area information in association with information on restriction of image recording within the country A. Given that there is a restriction on recording of images within the country A, for example, information relating to the restriction is stored. The area information in each of the divided areas may be stored in a list or table format that maps latitude and longitude information to designation of an area in which the spot is located. A publicly known technology may be used in the format in which the area information storage unit 51 stores the area information.

The communication unit 52 is communicably connected to the communication network 9 wirelessly or by wire and communicates with the communication unit 16 of the drive recorder 1 via the communication network 9.

The control unit 53 includes a position information acquisition unit 53a and an area information processing unit 53b. For example, the control unit 53 is comprised of a CPU or the like and performs the processes in the respective units described above by operating in accordance with a computer program stored in a storage unit 54. The storage unit 54 is comprised of a data storage device such as a random access memory (RAM), a flash memory, and a hard disk storage device and stores the computer program, etc. executed in the control unit 53.

The position information acquisition unit 53a of the control unit 53 acquires the position information sent from the drive recorder 1 mounted on the vehicle via the communication unit 52 and outputs the position information on the vehicle thus acquired to the area information processing unit 53b.

The area information processing unit 53b identifies the area in which the vehicle is located based on the position information on the vehicle acquired by the position information acquisition unit 53a. The area information processing unit 53b extracts the area information relating to restriction on image recording associated with the area in which the vehicle is located from the area information storage unit 51. The area information processing unit 53b sends the extracted area information to the drive recorder 1 via the communication unit 52.

Figure 4:
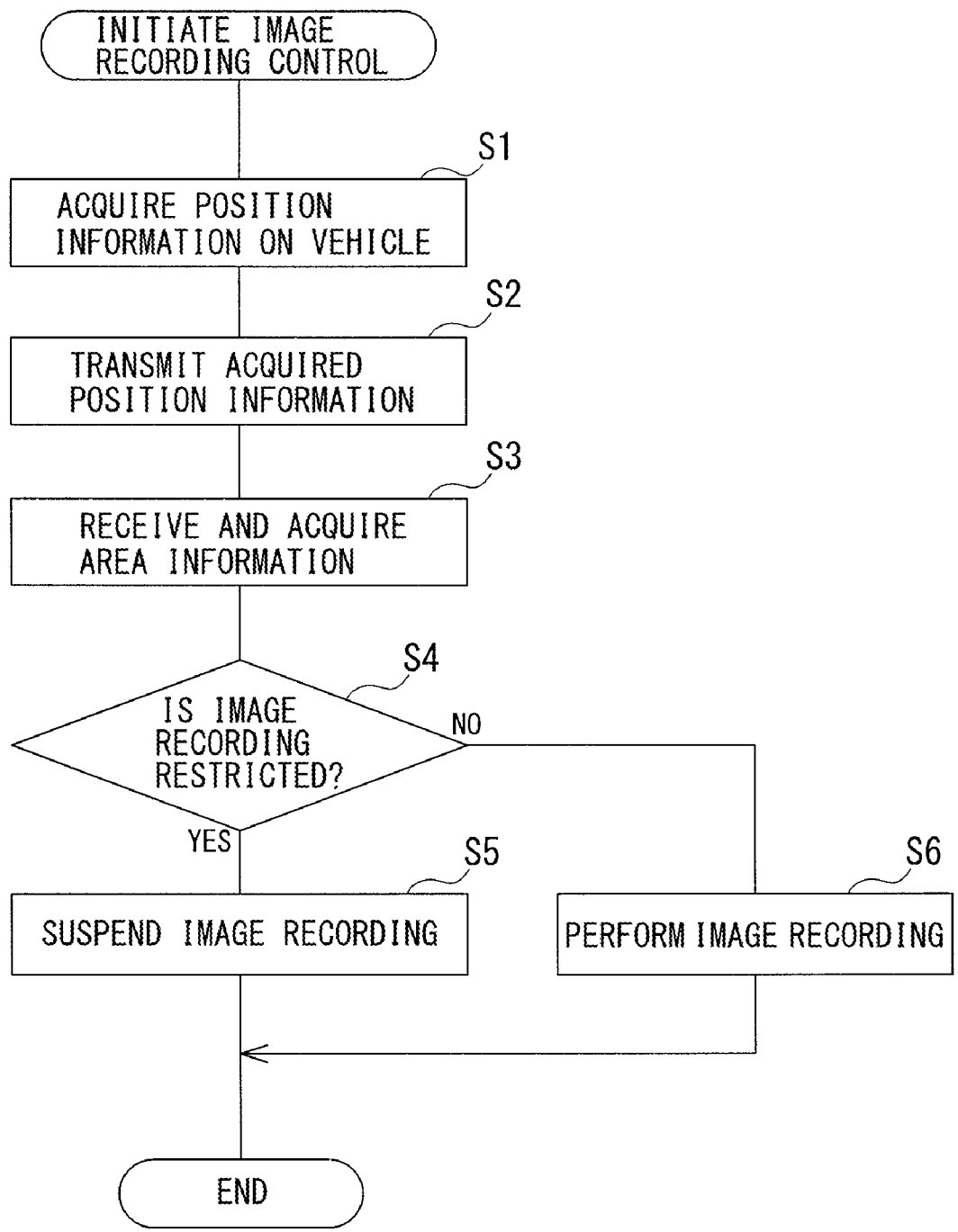
FIG. 4 is a flowchart showing a sequence of steps of image recording control process in the drive recorder.

A description will now be given of the operation of the drive recorder 1 based on image recording control process in the drive recorder 1. FIG. 4 is a flowchart showing a sequence of steps of image recording control process in the drive recorder 1. The drive recorder 1 acquires current position information on the vehicle by using the position information acquisition unit 17a of the control unit 17 (S1). The function control processing unit 17b transmits the position information on the vehicle acquired by the position information acquisition unit 17a to the server apparatus 5 via the communication unit 16 (S2). Upon acquiring the position information on the vehicle, the server apparatus 5 identifies the area in which the vehicle is located, extracts the area information relating to restriction on image recording in that area, and transmits the extracted information to the drive recorder 1.

The function control processing unit 17b of the drive recorder 1 receives and acquires the area information transmitted from the server apparatus 5 via the communication unit 16 (S3). The function control processing unit 17b determines whether the area information indicates a restriction on image recording (S4). When there is a restriction on image recording (S4: YES), the function control processing unit 17b suspends the image recording process in the image processing unit 11 (S5) and terminates the process. When there is no restriction on image recording (S4: NO), the function control processing unit 17b performs the image recording process in the image processing unit 11 (S6) and terminates the process.

Figure 5:
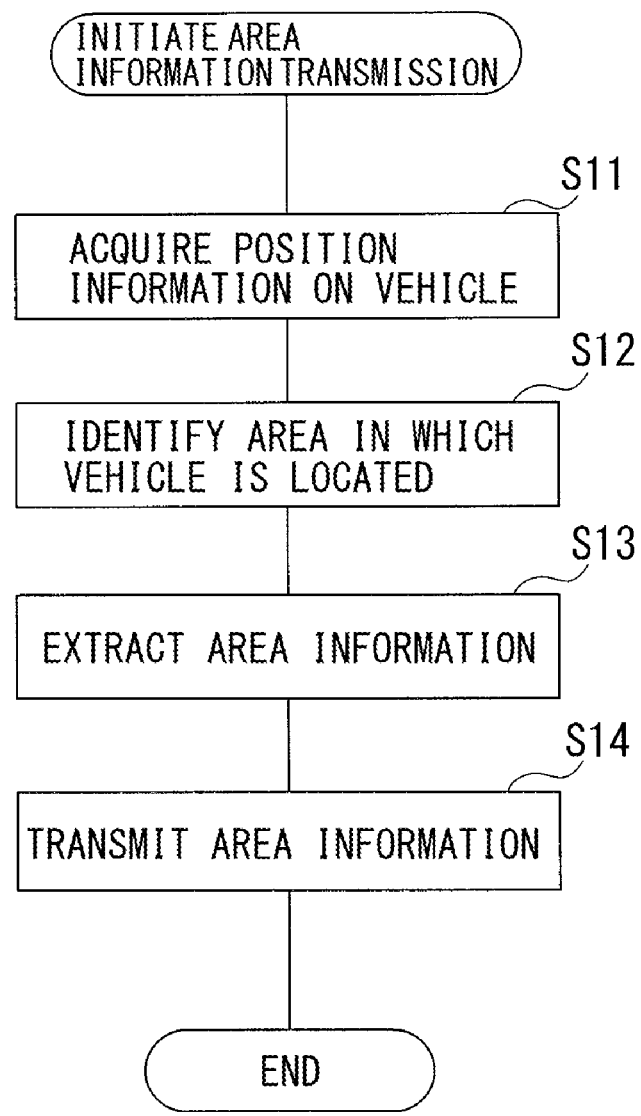
FIG. 5 is a flowchart showing a sequence of steps of area information transmission process in the server apparatus.

FIG. 5 is a flowchart showing a sequence of steps of area information transmission process in the server apparatus 5. The position information acquisition unit 53a of the server apparatus 5 acquires the position information on the vehicle from the drive recorder 1 (S11). The area information processing unit 53b identifies the area in which the vehicle is located based on the position information on the vehicle (S12).

The area information processing unit 53b extracts the area information in the area in which the vehicle is located, from the information stored in the area information storage unit 51 (S13). The area information processing unit 53b transmits the extracted area information to the drive recorder 1 via the communication unit 52 (S14).

The drive recorder 1 can suspend the image recording process when the vehicle is found to be located in an area with a restriction on image recording based on the area information transmitted from the server apparatus 5. Further, the drive recorder 1 can control, based on the area information transmitted from the server apparatus 5, its function. For example, the drive recorder 1 performs the image recording process or changing the quality of images recorded, when it is found that the vehicle is located in an area with no restriction on image recording, when the vehicle is located in a high accident area, etc., or when the vehicle is located in a sightseeing spot.

When the vehicle moves from an area with a restriction on image recording to an area with no restriction on image recording, the drive recorder 1 can initiate the image recording process suspended so far. Thus, the drive recorder 1 can perform function control on suspension and initiation of image recording in the vehicle based on the area information.

Further, in the above-described step S5, the function control processing unit 17b may alert the user that the vehicle is located in an area with a restriction on image recording, by using the alert unit 15. The function control processing unit 17b may suspend the image recording process when the user uses the user operation input unit 14 to select to suspend the image recording process as a result of the alert.

Further, when the vehicle moves from an area with a restriction on image recording to an area with no restriction on image recording, the function control processing unit 17b may alert the user that the vehicle has moved to an area with no restriction on image recording, by using the alert unit 15. The function control processing unit 17b may initiate the image recording process when the user uses the user operation input unit 14 to select to initiate the image recording process as a result of the alert.

Second Embodiment

Figure 6:
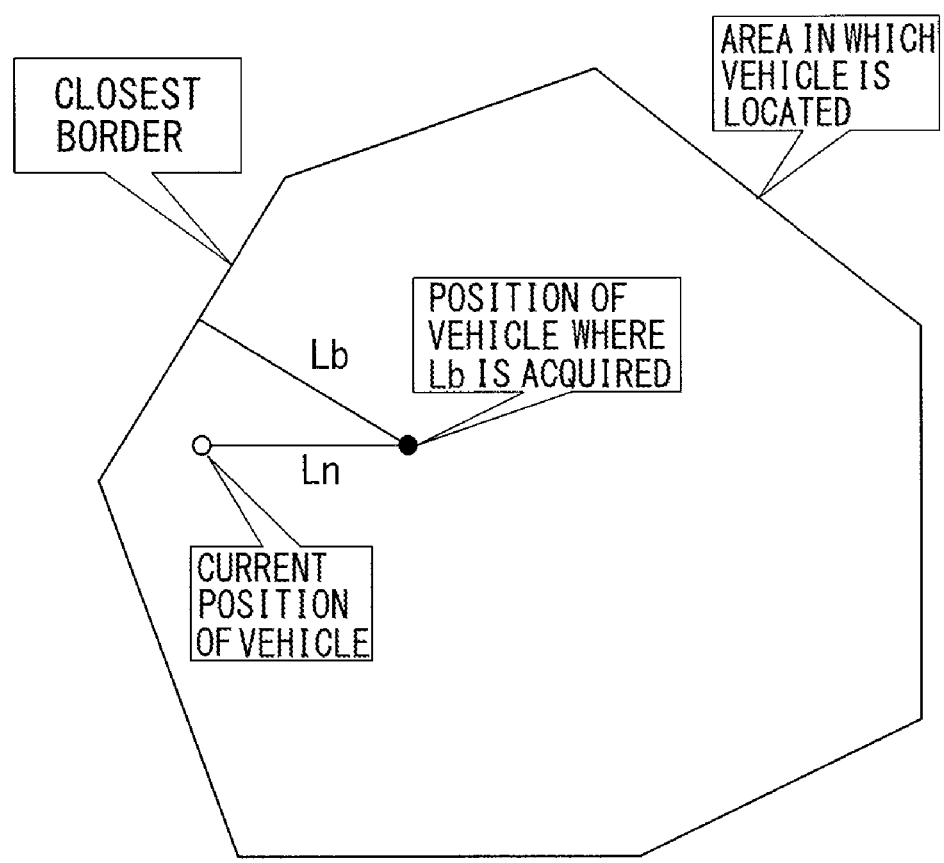
FIG. 6 is a schematic diagram for illustrating the timing of position information transmission in the drive recorder according to embodiment 2.

FIG. 6 is a schematic diagram for illustrating the timing of position information transmission in the drive recorder 1 according to embodiment 2. The area information transmitted from the server apparatus 5 is configured to include information on a distance Lb to the border of the area in which the vehicle is located closest to the position of the vehicle, in addition to the information relating to restriction on image recording.

The function control processing unit 17b of the drive recorder 1 determines the timing of transmitting the position information on the vehicle in accordance with the distance Lb. For example, the function control processing unit 17b may configure the position information on the vehicle to be transmitted once in every one hour when the distance Lb is 100 km and may configure the position information on the vehicle to be transmitted once in every one minute when the distance Lb is 1 km. Further, the function control processing unit 17b identifies the time required to reach the border of the area based on the distance Lb and the vehicle speed acquired via the input and output interface 13 and determines the timing of transmitting the position information next. The drive recorder 1 may suspend the transmission of the position information until there is a likelihood that the vehicle moves from an area in which it is located to another area, thereby reducing the communication traffic and the volume of processing in the server apparatus 5.

Further, the function control processing unit 17b may identify a distance Ln between the position of the vehicle where the position information was transmitted previously to acquire the area information for the distance Lb and the current position of the vehicle. The function control processing unit 17b may determine the timing of transmission so that the position information is transmitted at a point of time that the distance Lb is reached or at a point of time that the distance Lb is nearly reached. In this case, too, the drive recorder 1 may suspend the transmission of the position information until there is a likelihood that the vehicle moves from an area in which it is located to another area, thereby reducing the communication traffic and the volume of processing in the server apparatus 5.

Variation

The server apparatus 5 may store a map including borders of areas, road information, etc. and may increase the precision of estimation of the vehicle position by checking the map against the position information on the vehicle received from the drive recorder 1 for map matching correction.

In the above-described embodiment, the drive recorder 1 performs control relating to restriction on image recording. Alternatively, the server apparatus 5 may store setting information relating to restriction on image recording and include the setting information in the area information before transmitting the area information to the drive recorder 1. The setting information relating to restriction on image recording is information designating whether a restriction on image recording in the drive recorder 1 is effected automatically or manually or information designating initiation or suspension of recording.

Alternatively, the area information stored by the server apparatus 5 may be information relating to a dangerous region such as a high accident area. When it is determined that the vehicle position enters that area, the area information is transmitted to the drive recorder 1 to initiate imaging and recording automatically. When that area information is received, the drive recorder 1 alerts the user that imaging and recording are initiated even while imaging and recording are being suspended. When the user enters a user operation for permission, or when the user has set a permission in advance, the drive recorder 1 initiates imaging and recording.

Further, the drive recorder 1 may be equipped with a mode to transmit desired regional information (e.g., regions in which accidents, disasters, blackouts have occurred, regions of frequent traffic incidents such as so-called aggressive driving, etc.) in response to a user operation. The server apparatus 5 stores the received information in the area information storage unit 51 as dangerous region information. In the case of area information relating to occurrence of disasters, it is preferred that the area information provided in the server apparatus 5 be updated appropriately to maintain the latest state.

Further, the drive recorder 1 may transmit the vehicle position to the server apparatus 5 periodically to cause the server apparatus 5 to analyze a route or area in which the vehicle having the drive recorder 1 mounted thereon travels frequently. When the vehicle position is in the route or area traveled frequently, the server apparatus 5 transmits the area information to the drive recorder 1 to initiate imaging and recording automatically.

When that area information is received, the drive recorder 1 alerts the user that imaging and recording are initiated even while imaging and recording are being suspended. When the user enters a user operation for permission, or when the user has set a permission in advance, the drive recorder 1 initiates imaging and recording.

Conversely, imaging may be permanently suspended in the route or area frequently traveled. This is because the image of the route frequently traveled is not played back and checked so often. The information on the route or area frequently traveled may not be stored in the server apparatus 5 and may be stored in a recorder inside the drive recorder 1 or in an an external apparatus.

An external apparatus or recording medium that stores information relating to the route or area in which the vehicle having the drive recorder 1 mounted thereon travels frequently may be connected or attached to a different drive recorder 1 for use. The drive recorder 1 may acquire information relating to the frequently traveled route or area from the recording medium, etc. connected or attached and transmit the information to the server apparatus 5.

This results in a service mode whereby the user can use the information relating to the route or area in which the vehicle travels frequently other outside the drive recorder 1 (or the vehicle) used on a daily basis.

The server apparatus 5 may be configured to update or maintain the latest disaster information for each area (or region, etc.) periodically. When a disaster warning is issued in the area in which the drive recorder 1 is located, the area information is configured to include that information before being transmitted to the drive recorder 1. The drive recorder 1 alerts the user of the disaster information.

The drive recorder operation system 100, including the server apparatus 5, may provide a service of communicating disaster information to the user as well as the information on image recording control in the drive recorder 1. Further, the drive recorder 1 may automatically initiate imaging and recording in an area with disaster information.

A description will be given of the features of the drive recorder 1, image recording method, and image recording program according to the embodiment and the variation. The drive recorder 1 includes the imaging unit 11a, the image processing unit 11, the position information acquisition unit 17a, the communication unit 16, and the function control processing unit 17b. The imaging unit 11a captures an image of the neighborhood of the vehicle. The image processing unit 11 records the image captured by the imaging unit 11a in the recording medium 12. The position information acquisition unit 17a acquires position information on the vehicle. The communication unit 16 communicates with the server apparatus 5 to deliver information including the position information. The function control processing unit 17b acquires area information transmitted from the server apparatus 5 based on the position information, the area information relating to an area in which the vehicle is located. This allows the drive recorder 1 to control its function relating to image recording in the vehicle, based on the area information.

Further, the function control processing unit 17b suspends or initiates image recording by the image processing unit 11, based on the area information. The allows the drive recorder 1 to control its function to restrict image recording in the vehicle in an area, etc. in which image recording is restricted.

Further, the function control processing unit 17b alerts the user of the area information. This allows the drive recorder 1 to let the user know that the area in which the vehicle is located is an area in which, for example, image recording is restricted.

Further, the area information includes a distance to the border of the area in which the vehicle is located closest to the position of the vehicle. The function control processing unit 17b determines the timing of transmitting the position information to the server apparatus 5 in accordance with the distance to the border. This allows the drive recorder 1 to reduce the volume of processing in the server apparatus 5.

Further, the function control processing unit 17b determines the timing of transmitting the position information in accordance with the distance to the border and the distance between the position where the position information was acquired and the current position. This allows the drive recorder 1 to reduce the communication traffic and the volume of processing in the server apparatus 5.

The user operation input unit 14 for receiving input information from the user is further provided. The function control processing unit 17b suspends or initiates image recording by the image processing unit 11 based further on the input information received in the user operation input unit 14. This allows the drive recorder 1 to control its function manually based on the area information acquired from the server apparatus 5.

Further, the image recording method includes an imaging step, an image processing step, a position information acquisition step, a communication step, and a function control processing step. The imaging step captures an image of the neighborhood of the vehicle. The image processing step records the image captured by the imaging step in the recording medium. The position information acquisition step acquires position information on the vehicle. The communication step communicates with the server apparatus 5 to deliver information including the position information. The function control processing step acquires area information transmitted from the server apparatus 5 based on the position information, the area information relating to an area in which the vehicle is located. According to this image recording method, the function relating to image recording in the vehicle can be controlled based on the area information.

Further, a non-transitory recording medium for image recording encoded with a program causes a computer to perform the steps including an imaging step, an image processing step, a position acquisition step, a communication step, and a function control processing step. The imaging step captures an image of the neighborhood of the vehicle. The image processing step records the image captured by the imaging step in the recording medium. The position information acquisition step acquires position information on the vehicle. The communication step communicates with the server apparatus 5 to deliver information including the position information. The function control processing step acquires area information transmitted from the server apparatus 5 based on the position information, the area information relating to an area in which the vehicle is located. According to this image recording program, the function relating to image recording in the vehicle can be controlled based on the area information.

For example, the server apparatus 5 may only store, as area information, position information such as latitude and longitude information relating to each divided area and may only transmit information designating an area in which the vehicle is located, based on the position information transmitted by the drive recorder 1. The drive recorder 1 may control its function (e.g., change the setting of image quality in image recording) based on the area information transmitted from the server apparatus 5. When the area information indicating that the vehicle is in a high accident area is received from the server apparatus 5, for example, images may be at a high image frame rate. In this case, it is preferred that the drive recorder 1 maintains information indicating the type of function control performed based on the area information, and that the information be modified as desired by the user.

Given above is an explanation based on an embodiment of the present invention. The embodiments are intended to be illustrative only and it will be understood by those skilled in the art that variations and modifications are possible within the claim scope of the present invention and that such variations and modifications are also within the claim scope of the present invention. Therefore, the description in this specification and the drawings shall be treated to serve illustrative purposes and shall not limit the scope of the invention.

What is claimed is:

1. A drive recorder comprising:
   an imaging unit that captures an image of a neighborhood of a vehicle;
   an image processing unit that records the image captured by the imaging unit in a recording medium;
   a position information acquisition unit that acquires position information on the vehicle;
   a communication unit that communicates with a server apparatus to deliver information including the position information; and
   a function control processing unit that acquires area information transmitted from the server apparatus based on the position information, the area information relating to an area in which the vehicle is located, and controls a function accordingly, wherein
   the area information includes a distance to a border of the area in which the vehicle is located closest to a position of the vehicle, and the function control processing unit determines a timing of transmitting the position information to the server apparatus in accordance with the distance.

2. The drive recorder according to claim 1, wherein
   the function control processing unit determines the timing in accordance with the distance and a distance between a position where information on the distance is acquired and a current position.

3. The drive recorder according to claim 1, further comprising:
   a user operation input unit that receives input information from a user, wherein
   the function control processing unit suspends or initiates image recording by the image processing unit based further on the input information received in the user operation input unit.

4. An image recording method comprising:
   capturing an image of a neighborhood of a vehicle;
   recording the image captured by the imaging in a recording medium;
   acquiring position information on the vehicle;
   communicating with a server apparatus to deliver information including the position information; and
   acquiring area information transmitted from the server apparatus based on the position information, the area information relating to an area in which the vehicle is located including a distance to a border of the area closest to a position of the vehicle, and controlling a function accordingly, including determining a timing of transmitting the position information to the server apparatus in accordance with the distance.

5. A non-transitory recording medium for image recording encoded with a program causing a computer to implement modules, including:
   a module that captures an image of a neighborhood of a vehicle;
   a module that records the image captured by the imaging in a recording medium;
   a module that acquires position information on the vehicle;
   a module that communicates with a server apparatus to deliver information including the position information; and
   a module that acquires area information transmitted from the server apparatus based on the position information, the area information relating to an area in which the vehicle is located including a distance to a border of the area closest to a position of the vehicle, and controls a function accordingly, including determining a timing of transmitting the position information to the server apparatus in accordance with the distance.

* * * * *